United States Patent
Gioutsos et al.

(10) Patent No.: US 6,438,475 B1
(45) Date of Patent: *Aug. 20, 2002

(54) CRASH DETECTION SYSTEM

(75) Inventors: Tony Gioutsos, Novi; Craig White, Grosse Pointe; Brian J. Zahn, Plymouth; Daniel N. Tabar, South Lyon; David C. Milo, Farmington Hills, all of MI (US)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/254,699

(22) PCT Filed: Oct. 23, 1998

(86) PCT No.: PCT/US98/22421
§ 371 (c)(1),
(2), (4) Date: Jan. 3, 2000

(87) PCT Pub. No.: WO99/20491
PCT Pub. Date: Apr. 29, 1999

Related U.S. Application Data

(60) Provisional application No. 60/063,229, filed on Oct. 23, 1997.

(51) Int. Cl.[7] ........................ B60R 22/00; G05D 13/00; G06F 9/00; G06F 17/00; G06F 19/00

(52) U.S. Cl. ........................ 701/45; 701/46; 701/47; 180/274; 180/282; 280/735; 280/742; 280/731; 280/732; 280/734; 340/436; 307/10.1

(58) Field of Search ................ 701/45, 46, 47; 280/735, 742, 731, 732, 734; 180/282, 274; 340/436; 307/10.1

(56) References Cited

U.S. PATENT DOCUMENTS

| | | | | |
|---|---|---|---|---|
| 4,243,248 A | * | 1/1981 | Scholz et al. | 280/735 |
| 4,900,880 A | | 2/1990 | Breed | |
| 4,995,639 A | | 2/1991 | Breed | 280/735 |
| 5,153,393 A | | 10/1992 | Breed et al. | |
| 5,194,755 A | * | 3/1993 | Rhee et al. | 307/10.1 |
| 5,237,134 A | | 8/1993 | Thuen et al. | |
| 5,355,716 A | * | 10/1994 | Castelli | 73/1 D |
| 5,440,913 A | | 8/1995 | Crispin et al. | 73/1 D |
| 5,544,716 A | | 8/1996 | White | 180/274 |
| 5,547,149 A | * | 8/1996 | Kalberer et al. | 244/121 |
| 5,574,427 A | * | 11/1996 | Cavallaro | 340/436 |
| 5,608,270 A | | 3/1997 | Meister | |
| 5,610,817 A | * | 3/1997 | Mahon et al. | 364/424.056 |
| 5,984,350 A | | 11/1999 | Hagan et al. | |
| RE36,427 E | * | 12/1999 | Gioutos | 280/735 |
| 6,009,970 A | * | 1/2000 | Breed | 180/274 |
| 6,012,008 A | * | 1/2000 | Scully | 701/45 |

* cited by examiner

Primary Examiner—William A. Cuchlinski, Jr.
Assistant Examiner—Ronnie Mancho
(74) Attorney, Agent, or Firm—Lonnie Drayer; Patrick Stiennon

(57) ABSTRACT

A crash detection system comprises two sensors with complementary performance characteristics, a controller evaluates the signals from both sensors to determine whether an airbag should be activated, when an airbag should be activated and whether multiple stages of the airbag should be activated. The first sensor preferably comprises a ball-in-tube sensor and the second sensor preferably comprises an electronic sensing module comprising an accelerometer and a CPU. The CPU receives signals from the accelerometer and the ball-in-tube sensor. The controller activates the airbag only if both sensors generate fire signals. The controller generates an airbag activation signal based upon crash type and the sum of the times required from the beginning of the crash for both sensors to generate fire signals.

8 Claims, 4 Drawing Sheets

BIT ALGORITHM FLOW DIAGRAM

* THRESHOLD (MEASURE)(MODE)(STAGE)

* THRESHOLD (MEASURE)(MODE)(STAGE)

CRASH DETECTION SYSTEM

This application claims priority from provisional application Ser. No. 60/063,229, filed Oct. 23, 1997.

BACKGROUND OF THE INVENTION

The present invention relates generally to a crash detection system and more particularly to a crash detection system utilizing multiple sensors with different performance characteristics. Crash detection systems in vehicles determine the occurrence and severity of a crash and, based upon the severity of the crash, activate the vehicle airbag. The crash detection system preferably correctly makes the determination whether to activate the airbag as early in the crash as possible. The earlier the airbag activation signal is generated, the more time is available to inflate the airbag. If the crash is detected earlier in the crash event, the airbag can be inflated more slowly and with less force, thereby reducing potential injury to the passenger from the airbag inflation itself. Increasing the sensitivity of the sensor will generate an airbag activation signal earlier in the crash, but detecting the occurrence of a crash early must be balanced against the danger of an unnecessary airbag activation.

The most commonly utilized crash detection sensor is a ball-in-tube "BIT" sensor mounted at the forward end of a vehicle. Generally, the BIT sensor comprises a magnetic ball retained at one end of a tube by a permanent magnet. In the event of an impact, the ball is moved toward the opposite end of the tube away from the magnet toward a pair of electrical contacts. If the impact is sufficient, the ball overcomes the force of the magnet and closes the contacts electrically, generating the airbag activation signal. The BIT sensor is susceptible to generating an unnecessary airbag activation signal during minor fender benders, for which activation of the airbag would be undesirable. For example, the BIT sensor is susceptible to potentially generating an airbag activation signal in the event that the vehicle hits a deer. It is undesirable to deploy the airbag in a vehicle-deer collision, since the entire vehicle will not decelerate sufficiently to require the airbag deployment for the protection of the passenger. Further, deployment of the airbag in a vehicle-deer collision may cause the driver to lose control of the vehicle. In order to reduce the potential for unnecessary airbag activations in minor fender benders or deer collisions, the threshold of deceleration required to activate the BIT sensor is larger than would otherwise be desirable. This in turn causes the BIT sensor to activate the airbag later in the crash.

An improved crash detection sensor currently utilized generally comprises an electronic sensing module comprising an accelerometer sending an accelerometer signal to a CPU. The electronic sensor module is mounted near the center of the vehicle and is less susceptible to generating airbag activation signals in minor collisions, such as vehicle-deer collisions. However, the electronic sensing module may be susceptible to generating an airbag activation signal on a rough road. For that reason, the threshold of the electronic sensing module is increased above that which would otherwise be desirable. Again, this causes the airbag activation signal to be generated later in the crash.

The increased thresholds generally utilized in the BIT sensors and electronic sensing modules generally results in more time being required to detect a crash. As result, the airbag must then be activated more quickly with greater force, thereby increasing potential injury to the passenger by the airbag.

SUMMARY OF THE INVENTION

The present invention provides a crash detection system utilizing two crash detection sensors having different performance characteristics. An airbag activation signal is generated based upon an evaluation of signals from both crash detection sensors. In this manner, the potential for erroneous airbag activations is reduced, as is the time to properly detect a crash and the severity of the crash.

Preferably, the first sensor comprises a ball-in-tube sensor, generally as is known. The ball-in-tube preferably has a threshold lower than that generally utilized. The second sensor generally comprises an electronic sensing module with an accelerometer and CPU. The signals from the accelerometer and ball-in-tube sensor are sent to the CPU for evaluation. Based upon the signals from the first and second sensors, the CPU determines whether and when to activate the airbag and whether to activate multiple stages of the airbag.

Preferably, the CPU evaluates the acceleration signal from the accelerometer generally in the same manner as is currently known. The CPU analyzes the magnitude and shape of the accelerometer signal to determine the beginning of the crash, the severity of the crash and the type of crash. Based upon this, the CPU generates an accelerometer fire signal in a manner generally known currently, although preferably with a lower threshold.

The CPU then evaluates the type of crash and times required for the first and second sensors to generate fire signals to determine the severity of the crash. The CPU determines whether to activate the airbag, when to activate the airbag and whether to activate multiple stages of the airbag based upon the type of crash and the sum of the times from the beginning of the crash to the fire signals. Further, the CPU will not activate the airbag until both sensors have determined that the airbag should be activated, i.e. both sensors have generated fire signals. Because the two sensors have complementary performance characteristics regarding situations when the airbag should not be deployed, the thresholds of each sensor can be reduced in order to provide earlier crash detection. Since fire signals from both sensors are required before activation of the airbag, the complementary performance characteristics of the crash detection sensors will prevent firing of the airbag in undesirable situations.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF A PREFERRED EMBODIMENT

Figure 1:
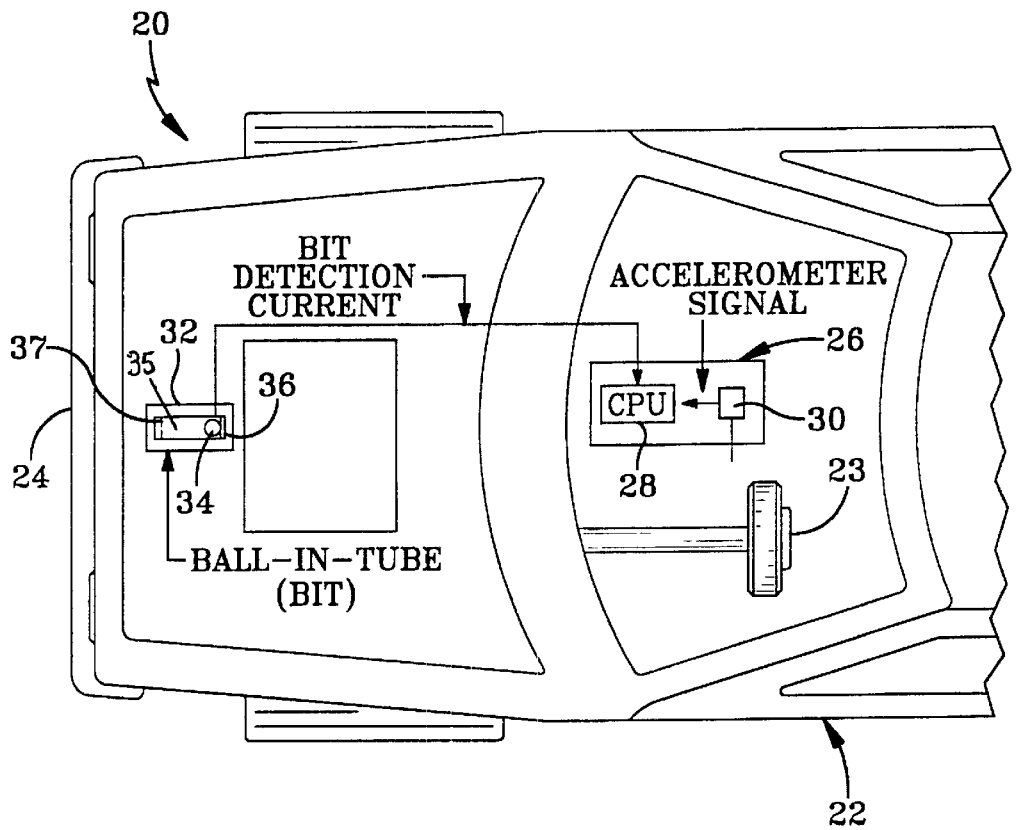
FIG. 1 is a schematic of the crash detection system of the present invention installed in a vehicle.

The present invention provides a crash detection system 20 for use in a vehicle 22 having an airbag 23 and a forward end 24. The crash detection system 20 generally comprises an electronic sensing module 26 having a CPU 28 receiving an accelerometer signal from an accelerometer 30. The electronic sensing module 26, including the CPU 28 and accelerometer 30, is generally similar to that currently available from Breed Technologies, Inc. with modifications to and additions of algorithms which will be described below. As will be described in more detail below, the accelerometer 30 generates an accelerometer signal which is sent to the CPU 28. The CPU 28 analyzes the accelerometer signal to detect generally the beginning of a crash, the crash severity and the crash type. Based in part upon the acceleration signal, the CPU 28 generates a fire signal to activate the airbag 23.

In the crash detection system 20 of the present invention, the electronic sensing module 26 also receives an input from a ball-in-tube or "BIT" sensor 32 mounted at the forward end 24 of the vehicle 22. BIT sensors 32 are well known in the industry and have been utilized for years in millions of vehicles. Their performance is well established and documented. A preferred BIT sensor 32 is available commercially from Breed Technologies, Inc. For the reasons generally described herein, the BIT sensor 32 in the present invention has a lower threshold than that typically utilized currently. Generally, the BIT sensor 32 comprises a magnetic ball 34 retained at one end of a tube 35 by a permanent magnet 36. In the event of an impact, the ball 34 is moved toward the opposite end of the tube 35 away from the magnet 36 toward a pair of electrical contacts 37. If the impact is sufficient, the ball 34 overcomes the force of the magnet 36 and closes the contacts 37 electrically, generating a BIT fire signal. In the present crash detection system 20 the BIT fire signal is sent to the CPU 28 of the electronic sensing module 26 for analysis as will be described below.

The vehicle 22 includes at least one airbag 23, which is preferably a multiple stage airbag 23. For purposes of illustration, the airbag 23 will be desribed as a two stage airbag 23. In other words, the airbag 23 includes two inflators one or both of which may be fired during a crash, depending upon the severity of the crash as determined by the crash detection system 20.

Figure 2:
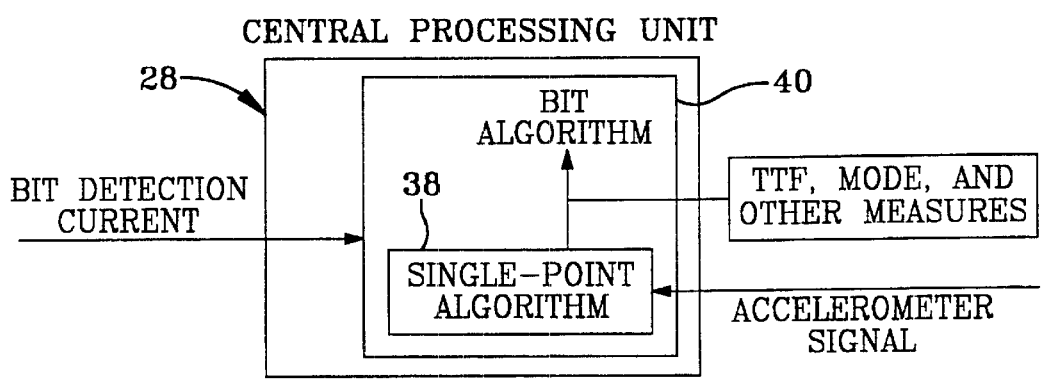
FIG. 2 is a diagram of the algorithms in the CPU of the crash system of FIG. 1.

As can be seen in FIG. 2, the CPU 28 receives the BIT fire signal from the BIT sensor 32 and the accelerometer signal from the accelerometer 30. The accelerometer signal is processed by the single point algorithm 38. The single point algorithm 38 is generally similar to that used in the current Breed Technologies electronic sensing module, although preferably with lower thresholds. Generally, the single point algorithm 38 analyzes the accelerometer signal to correlate the closure time to a "crash time" determined to be the beginning of a crash, which is defined at a certain threshold of acceleration. The single point algorithm 38 analyzes the accelerometer signal to determine the type of crash based upon the shape of the accelerometer signal over time and then generates an accelerometer fire signal based upon the magnitude and shape of the accelerometer signal. The time to fire is determined by the single point algorithm 38 as the time between the determination of the "crash time" and the point where the single point algorithm 38 decides that the airbag 23 should be deployed. The time to fire from the single point algorithm 38 is sent to a BIT algorithm 40. The single point algorithm 38 also sends a firing mode signal based upon crash type as well as other information related to the type of crash or shape of the accelerometer signal.

Table 1 defines the crash severity in terms of the system response. For example, in a crash severity of Level 1, one of the inflators in the airbag will be activated, but only if the passenger is unbelted. In crash severity of Level 2, one of the airbag inflators in the airbag 23 will be inflated whether the passenger is belted or unbelted. In the crash severity of Level 3, both inflators will be activated if the passenger is unbelted; one of the inflators will be activated if the passenger is belted. In a crash severity of Level 4, both inflators of airbag 23 are activated whether the passenger is belted or unbelted. It should be apparent that any number of levels of crash severity could be utilized as well as any number of airbag inflators and any number of other conditions, such as belted/unbelted, passenger weight, passenger height, etc.

TABLE 1

| Crash Severity | System Response Unbelted | System Response Belted |
| --- | --- | --- |
| 1 | Stage 1 | No Activation |
| 2 | Stage 1 | Stage 1 |
| 3 | Stage 2 | Stage 1 |
| 4 | Stage 2 | Stage 2 |

The BIT algorithm 40 then evaluates the information from the single point algorithm 38 as well as the BIT fire signal from the BIT sensor 32. The operation of the BIT algorithm 40 will be described in more detail with respect to Table 2 and FIG. 3. In Table 2, a number of crash types are indicated as well as their resulting crash severity. Table 2 indicates a variety of standard crash types and the minimum required time to fire the airbag 23 in that crash type. For example, in a 35 MPH frontal crash, the airbag 23 must be activated promptly, while in a 14 MPH frontal crash, the airbag 23 can be activated later in the crash. The "BIT TTF" column indicates the time between the beginning of the crash as determined by the electronic sensing module 26, and the generation of the BIT fire signal. The "Single-Point Algorithm TTF" column indicates the time between the beginning of the crash and the point where the single point algorithm 38 generates the fire signal. The "Σ of TTFs" column indicates the sum of the BIT and single point algorithm TTF. As will be described below, much about the severity of the crash can be determined simply by the sum of the TTFs.

TABLE 2

| Crash Type | Crash Severity | Minimum Required TTF | BIT TTF | Single Point Algo TTF | Σ of TTFs |
| --- | --- | --- | --- | --- | --- |
| Rough Road | Off | — | NT | most NT, some ON | — |
| 10 MPH Thatchum | Off | — | NT | NT | — |
| 8 MPH Frontal | Off | — | 50 ms | NT | — |
| 14 MPH Frontal | 1 | 30 ms | 26 ms | 24 ms | 50 ms |
| 20 MPH Frontal | 2 | 25 ms | 22 ms | 18 ms | 40 ms |
| 30 MPH Frontal | 3 | 15 ms | 12 ms | 15 ms | 27 ms |
| 35 MPH Frontal | 4 | 14 ms | 10 ms | 14 ms | 24 ms |
| 36 MPH Car-To-Car | 1 | 45 ms | 28 ms | 35 ms | 63 ms |
| 45 MPH Car-To-Car | 2 | 30 ms | 25 ms | 26 ms | 50 ms |
| 60 MPH Car-To-Car | 2 | 26 ms | 17 ms | 26 ms | 43 ms |

TABLE 2-continued

| Crash Type | Crash Severity | Minimum Required TTF | BIT TTF | Single Point Algo TTF | Σ of TTFs |
|---|---|---|---|---|---|
| 30 MPH Pole | 4 | 40 ms | 16 ms | 23 ms | 39 ms |
| 30 MPH Bumper Overide | 2 | 40 ms | 9 ms | 35 ms | 43 ms |

It will be noted that the crash detection system 20 utilizes two sensors 26, 32 with very different performance characteristics, including complementary strengths and weaknesses regarding situations when the airbag 23 should not be deployed. Generally, in the BIT algorithm 40, there is an AND condition between the BIT fire signal and the accelerometer fire signal generated by the single point algorithm 38. This greatly reduces the danger of airbag actuation in events where airbag 23 actuation would be undesirable. For that reason, a lower threshold BIT sensor 32 and lower threshold single point algorithm 38 can be utilized, thereby resulting in earlier fire times in the event of a crash. For example, in the rough road condition shown in Table 2 the single point algorithm 38 based upon the accelerometer 30 data may generate a fire signal. However, the BIT sensor 32 is relatively resistant to false fire signals on a rough road. Therefore, in the crash detection system 20 of the present invention, the airbag 23 would not be activated, even with the lower threshold BIT sensor 32 and lower threshold single point algorithm 38. Since a lower threshold ball-in-tube sensor 32 is utilized, the crash detection system 20 is more sensitive to angular crashes. The lower threshold ball-in-tube sensor 32 may generate a BIT fire signal in a minor fender bender, for which activation of the airbag 23 would be undesirable; however, the single point algorithm 38 in that situation does not generate a fire signal. Therefore, the airbag 23 would not be activated in that situation. Similarly, in a vehicle-deer collision, the BIT sensor 32 may generate a BIT fire signal; however, the single point algorithm 38 would not generate a fire signal, thereby preventing activation of the airbag 23.

Figure 3:
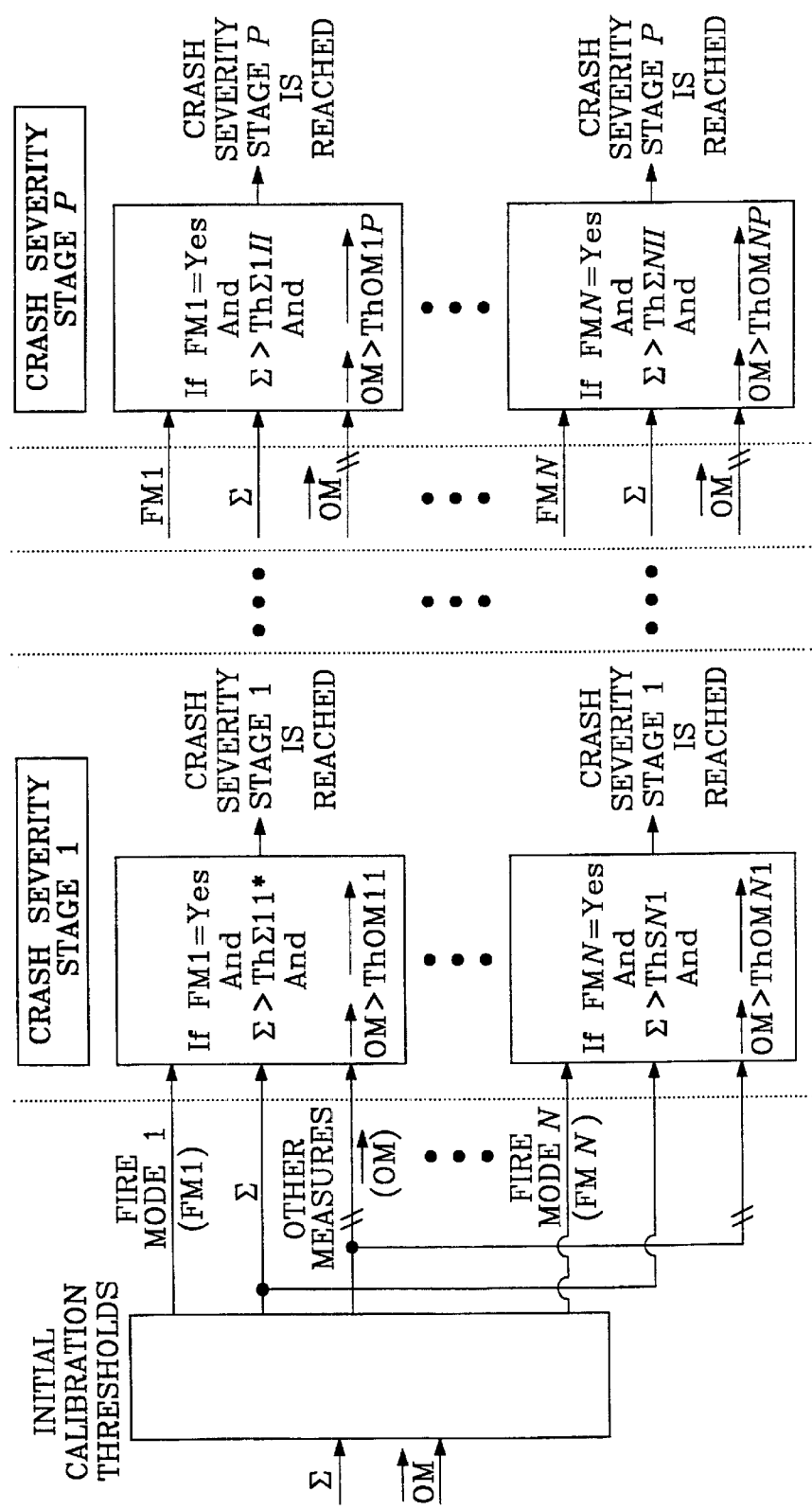
FIG. 3 is a flow diagram of the BIT algorithm of FIG. 2.

Referring to Table 2 and FIG. 3, in a 14 MPH frontal crash, the airbag 23 must be activated within 30 milliseconds. In the crash detection system 20, the BIT sensor 32 generates a fire signal in 26 milliseconds and the single point algorithm 38 generates a fire signal in 24 milliseconds. The BIT algorithm 38 determines that the crash severity is a level 1. Thus, the airbag 23, or at least the first stage of airbag 23, is activated at 26 milliseconds only if the passenger is unbelted. The sum of the TTFs (50 milliseconds) as well as the other measures for the single point algorithm 38 regarding crash type continue to be evaluated. In this case, the crash detection system 20 determines that a crash severity of level one has occurred and thus, referring to Table 1, stage one of the airbag 23 will be activated only if the passenger is unbelted.

In a 20 MPH frontal crash, the airbag 23 must be activated within 25 milliseconds. In that situation, the BIT sensor 32 will generate a BIT fire signal in 22 milliseconds and the single point algorithm 38 will generate a fire signal in 18 milliseconds. Thus, the first stage of the airbag 23 will be activated at 22 milliseconds. The sum of the TTF's, in this case 40 milliseconds, along with the other measures regarding the crash type from the single point algorithm 38 are evaluated by the CPU 28 and the BIT algorithm 40 to determine that a crash of level 2 has occurred. The first stage of the airbag 23 is thus activated whether the passenger is belted or unbelted. Referring to Table 2, in a 30 MPH frontal crash, the airbag 23 must be activated within 15 milliseconds. The BIT sensor 32 generates a fire signal in 12 milliseconds and the single point algorithm 38 generates a fire signal in 15 milliseconds. Therefore, at least the first stage of the airbag 23 is activated within 15 milliseconds. Based upon the sum of the TTF's, which is 27 milliseconds, and the other measures from the single point algorithm 38 regarding crash type, the crash detection system 20 also determines that the crash has a severity of level 3 and therefore activates the second stage of the airbag 23, if it is also determined that the passenger is unbelted.

Similarly, for the 35 MPH frontal crash, the airbag 23 must be activated within 14 milliseconds. The BIT sensor 32 generates a fire signal within 10 milliseconds and the single point algorithm within 14 milliseconds. Based upon the sum of the TTF's 24 milliseconds as well as the other measures from the single point algorithm 38, the crash detection system 20 determines that the crash severity was level 4 and therefore activates both airbag inflators in the airbag 23 whether the passenger is belted or unbelted.

The other crash types listed in Table 2 operate similarly. It should be noted that the 14 MPH frontal crash and the 45 MPH car to car crash both generate Σ of TTF's of 50 milliseconds, yet the 14 MPH frontal is a level 1 crash, while the 45 MPH car to car is a level 2 crash. The single point algorithm 38 distinguishes the two based upon the shape of the signal from the accelerometer 30 in a manner currently used in Breed Technologies electronic sensing module 26. Although as shown above much can be determined about the severity of the crash from the sum of the TTFs, more complicated algorithms can also be used. For example, currently known systems utilize "forgetting factors" to determine the crash severity. Each level of crash severity is evaluated independently, as shown in FIG. 3, with different forgetting factors. As is known, the forgetting factors are time-dependent, such that it is "easier" to reach a higher crash level determination earlier in the crash. As the crash progresses in time, a higher amplitude signal from the accelerometer is required to reach a determination of a certain crash level. These techniques are well-known and currently utilized in existing systems. By utilizing two complementary sensors with relatively lower thresholds than the known systems, the present invention will make the determination of a crash level earlier in the crash than in previous systems.

The crash detection system 20 of the present invention avoids erroneous firing in many situations, simply by requiring that both the BIT sensor 32 and single point algorithm 38 generate a fire signal before activating the airbag 23. Because the BIT sensor 32 and single point algorithm 38 have complementary performance characteristics, one sensor will prevent activation of the airbag 23 in situations for which activation would be undesirable but the other sensor indicates a fire signal. Further, the single point algorithm 38 looks for certain crash types. For a given crash type, the TTF of the BIT sensor 32, the single point algorithm 38 and the sum of the TTF's are related to the crash severity. Because the crash detection system 20 requires fire signals from both the BIT sensor 32 and the single point algorithm 38 before firing, lower threshold sensors can be utilized without risk of error. Lower thresholds of the BIT sensor 32 and single point algorithm 38 result in faster response times and earlier activation of at least one of the airbag actuators.

Figure 4:
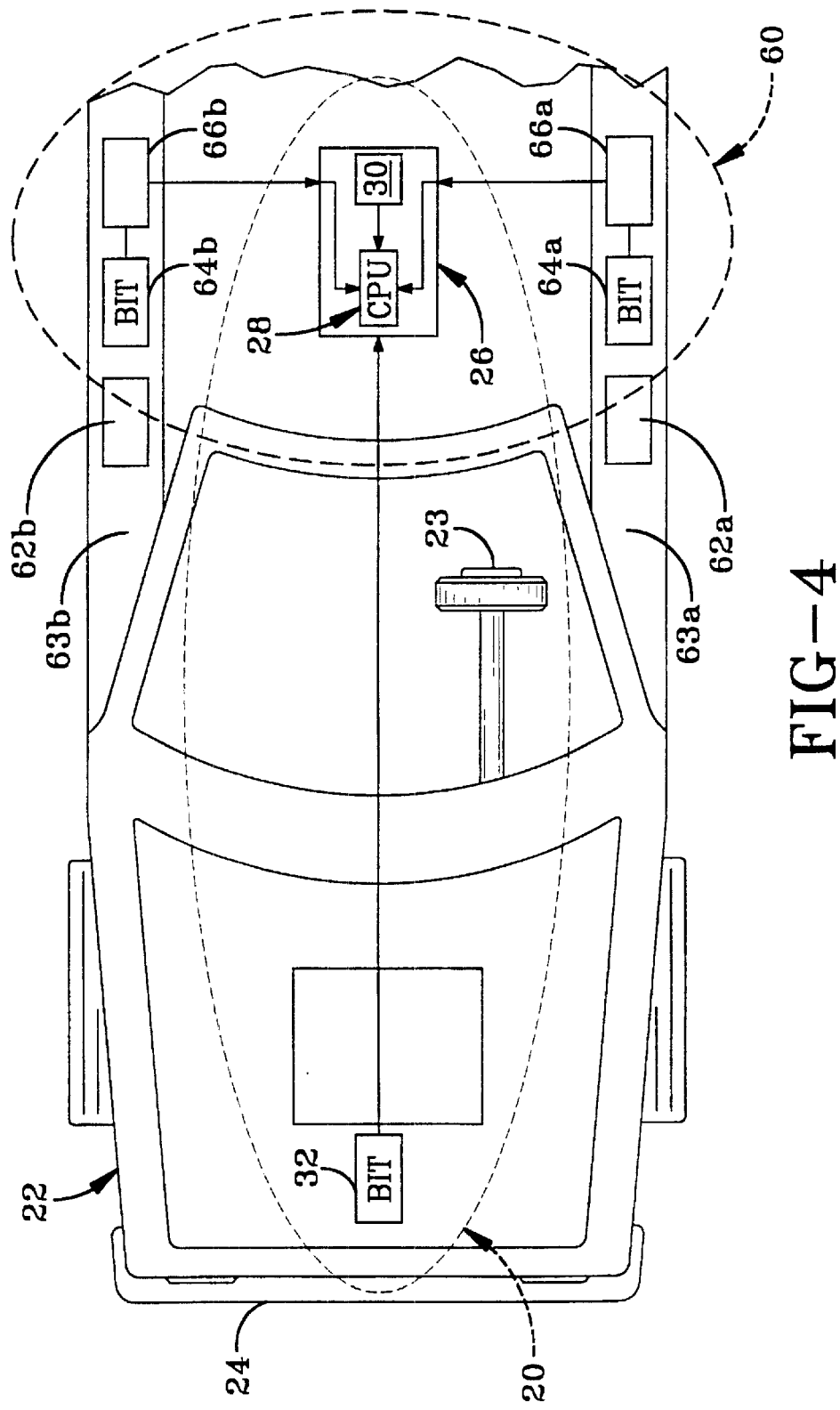
FIG. 4 is a schematic of an alternate embodiment of the present invention for also activating side air bags.

FIG. 4 illustrates an alternate crash detection system 60 for also detecting side impacts and activating side airbags 66a–b in the vehicle 22. The vehicle 22 preferably also includes the crash detection system 20, described in detail in FIGS. 1–3. The side crash detection system 60 utilizes the electronic sensing module 26 having CPU 28 with appropriate modifications and additions to the software the CPU 28 necessary to implement the methods and techniques described below. The side crash detection system 60 includes ball-in-tube sensors 64a,b installed in the driver and passenger doors 63a,b, respectively. The ball-in-tube sensors 64a,b generally identical to ball-in-tube sensor 32, with the thresholds adjusted accordingly. Side accelerometers 66a,b are also mounted on or adjacent the vehicle doors 63a,b, respectively. The accelerometers 66a,b are generally identical to accelerometer 30, but oriented along the lateral axis of the vehicle 22 and with thresholds adjusted accordingly. Signals from the ball-in-tube sensors 64a,b and accelerometers 66a,b are also sent to CPU 28 for analysis in the manner similar to that described with respect to the frontal crash detection system 20. Generally, CPU 28 will generate activation signals for each of the side airbag 62a,b independently, based upon signals from the corresponding ball-in-tube sensor 64a,b and accelerometer 66a,b. The CPU 28 will only generate an activation signal to the airbag 62 if the corresponding ball-in-tube sensor 64 and the accelerometer 66 generate a fire signal. The CPU 28 also evaluates the sum of the times to fire from the ball-in-tube sensor 64 and accelerometer 66 in a manner similar to that described with respect the frontal crashed detection system 20, although with thresholds adjusted accordingly.

In the side crashed detection system, the thresholds of the ball-in-tube sensor 64 and accelerometer 66 are reduced from those typically utilized, thereby significantly decreasing the time required to determine whether to deploy the airbags 62a,b. Again, since the sensors 64 and 66 have complementary performance characteristics, the likelihood of unnecessary activation is reduced.

Figure 5:
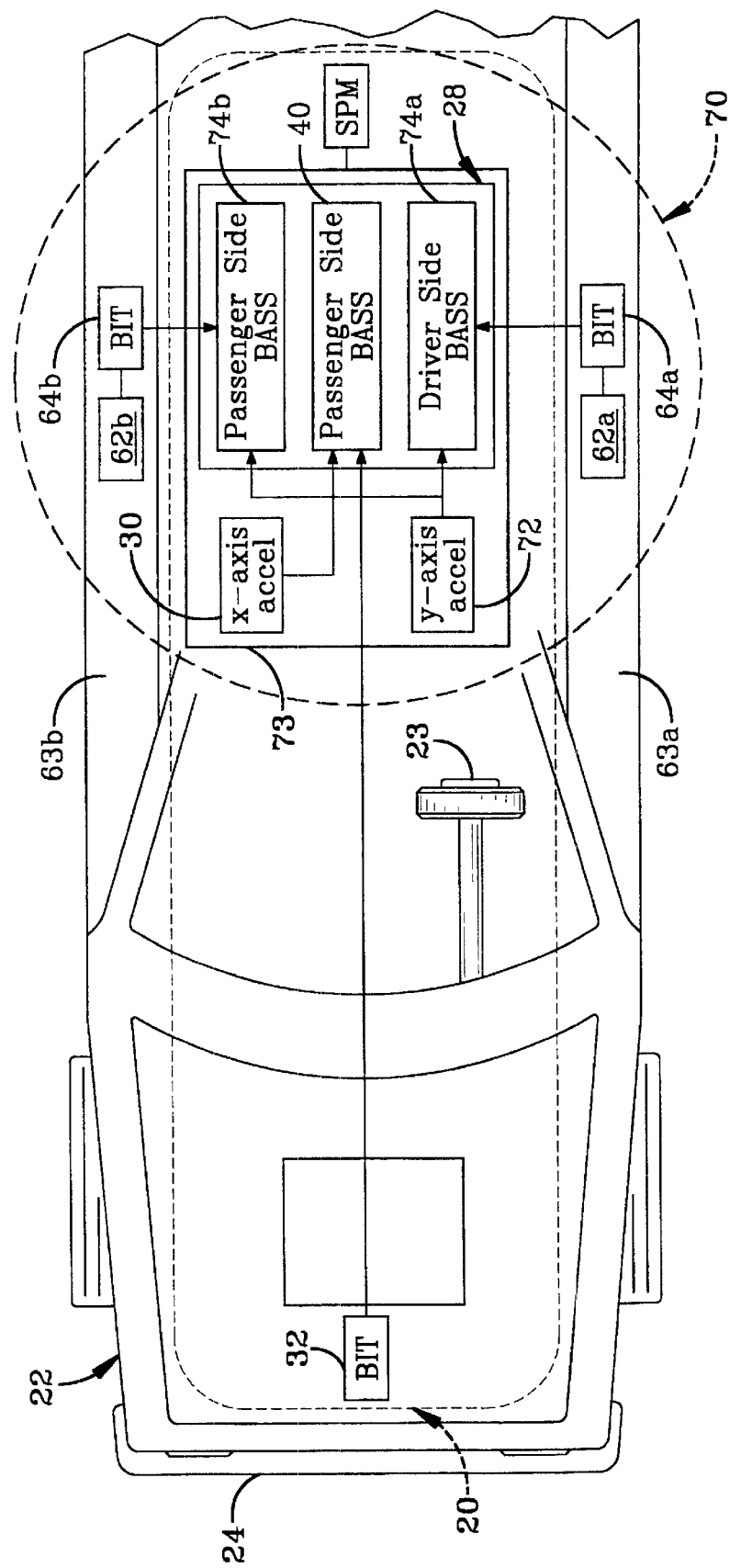
FIG. 5 is a schematic of another alternate embodiment for activating side air bags with the present invention.

An alternate side crash detection system 70 is illustrated in FIG. 5, again integrated with the frontal crashed detection system 20 in vehicle 22. In this embodiment, the ball-in-tube sensors 64a,b are again mounted in the vehicle doors 63a,b respectively; however, a single y axis accelerometer 72 is mounted in the electronic sensing module 73 with the longitudinal access accelerometer 30. Acceleration signals from the lateral axis accelerometer 72 are sent to the CPU 28. Side activation algorithms 74a,b each receives signals from the ball-in-tube sensors 64a,b respectively and both receive signals from the lateral access accelerometer 72. The operation and analysis of the signals is identical to that described with respect to FIG. 4. Again, the airbags 62a,b are activated only if the corresponding bit sensor 64a,b indicates a fire signal and the lateral axis accelerometer 72 also determines, based upon the magnitude and shape of the acceleration signal, that the airbag 62a or b (or both) should be activated. Cost is reduced in this system 70, through the reduction of the number of accelerometers and the number connections.

In any of the above embodiments, sensors other than BIT sensors could be utilized at the forward end of the vehicle. An accelerometer that correlates a "closure" or "trigger" time to a threshold from a "crash time" could be utilized in place of the BIT sensor.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A crash detecting system in a vehicle comprising:
   an automobile safety system;
   a first sensor of a ball-in-tube type, mounted in a vehicle crash zone, the first sensor providing a first fire signal;
   a second sensor of a type providing an acceleration vs. time output signal having a magnitude and a shape;
   a CPU connected to receive the output of the first sensor and the output of the second sensor, the CPU calculating a time of crash onset when the second sensor exceeds an acceleration threshold, the CPU calculating a first time to fire based on an elapsed time between the time of crash onset and the first sensor first fire signal, the CPU monitoring the second sensor and generating a crash type, a crash severity, and a second fire signal based upon the magnitude and shape with respect to time of the second sensor output signal, and a second time to fire signal based on an the elapsed time between the time of crash onset and the second sensor fire signal, and the CPU generating a signal to initiate the automobile safety system only if the CPU has received the first fire signal, and has generated the second fire signal, and the CPU calculating a sum combining the first time to fire and the second time to fire, and basing a decision to initiate the automobile safety system at least in part based on the calculated sum.

2. The crash detecting system of claim 1 further comprising a multistage air bag, wherein the decision to initiate the automobile safety system includes deciding to initiate one or more stages of the air bag.

3. A method of initiating a safety system in response to a vehicle undergoing a crash comprising:
   receiving a first fire signal from a ball-in-tube type sensor mounted in a crash zone of the vehicle;
   monitoring vehicle acceleration with a second vehicle mounted accelerometer sensor which provides an acceleration over time output signal having a magnitude and a shape, and determining a crash onset time based on vehicle acceleration exceeding a certain threshold of acceleration;
   determining a second fire signal from the second vehicle mounted sensor based upon the magnitude and shape of the acceleration over time output signal, as measured by the second vehicle mounted sensor;
   determining a first time to fire, for the first fire signal, by determining the time between the crash onset time and the first fire signal;
   determining a second time to fire for the second fire signal, by determining the time between the crash onset time and the second fire signal;
   determining a sum of the first time to fire and the second time to fire;
   on condition that the first fire signal and the second fire signal have been generated, and based on the sum of the first time to fire and the second time to fire, initiating at least one safety system.

4. The method of claim 3 further comprising the step of determining crash severity at least in part based on the sum of the first time to fire and the second time to fire, and also based on the magnitude and shape of the acceleration over time signal as measured by the second vehicle mounted sensor, and initiating the at least one safety system, based additionally upon the determination of crash severity.

5. The method of claim 3 wherein the ball-in-tube type sensor is mounted in a door of the vehicle, and the second vehicle mounted accelerometer is of a type for measuring lateral axis acceleration.

6. The method of claim 3 wherein the ball-in-tube sensor is located in the front of the vehicle.

7. A method of initiating a safety system in response to a vehicle undergoing a crash comprising:

receiving a first fire signal from a ball-in-tube type sensor mounted in a door of the vehicle which forms a crash zone of the vehicle;

monitoring vehicle acceleration with a second vehicle mounted accelerometer sensor of the type for measuring the lateral axial acceleration and providing an acceleration over time output signal having a magnitude and a shape, and determining a crash onset time based on vehicle acceleration exceeding a certain threshold of acceleration;

determining a second fire signal from the second vehicle mounted sensor based upon the magnitude and shape of the acceleration over time output signal, as measured by the second vehicle mounted sensor;

determining a first time to fire for the first fire signal, by determining the time between the crash onset time and the first fire signal;

determining a second time to fire for the second fire signal, by determining the time between the crash onset time and the second fire signal;

determining a sum of the first time to fire and the second time to fire;

on condition that the first fire signal and the second fire signal have been generated, and based on the sum of the first time to fire and the second time to fire, initiating at least one safety system.

8. The method of claim 7 further comprising the step of determining crash severity at least in part based on the sum of the first time to fire and the second time to fire, and also based on the magnitude and shape of the acceleration over time signal, as measured by the second vehicle mounted sensor, and initiating the at least one safety system, based additionally upon the determination of crash severity.

* * * * *